United States Patent [19]

Hughes

[11] 4,313,999
[45] Feb. 2, 1982

[54] LAMINATE COMPOSITION COMPRISING POLYETHERIMIDE IMPREGNATED FABRIC

[75] Inventor: Raymond B. Hughes, Schenectady, N.Y.

[73] Assignee: General Electric Company, Schenectady, N.Y.

[21] Appl. No.: 187,769

[22] Filed: Sep. 16, 1980

[51] Int. Cl.$^3$ .............................................. B32B 7/00
[52] U.S. Cl. ................................... 428/251; 525/424; 528/73; 428/256; 428/260; 428/273; 428/285; 428/290
[58] Field of Search ........................ 528/73; 525/424; 428/246, 251, 256, 260, 273, 285, 287, 290

[56] References Cited

U.S. PATENT DOCUMENTS 3,833,544  9/1974  Takekoshi et al. .................. 528/73
3,847,867  11/1974  Heath et al. .

Primary Examiner—James J. Bell
Attorney, Agent, or Firm—Hedman, Casella, Gibson & Costigan

[57] ABSTRACT

A laminate having desirable physical and high temperature properties is described. The laminate is composed of a conventional fabric material impregnated with a polyimide reaction product of substantially stoichimetric amounts of bis(etheranhydride) with a diamine compound, said reaction product being cross-linked with a tri-functional isocyanate agent.

12 Claims, No Drawings

LAMINATE COMPOSITION COMPRISING POLYETHERIMIDE IMPREGNATED FABRIC

INTRODUCTION TO THE INVENTION

This invention involves laminates. They have excellent high temperature properties and are both tough and, dependent upon the fabric utilized, flexible. The laminates are particularly useful for applications where they may be exposed to extreme heat and/or physical distress.

The invention is predicated upon the combination of a fabric material impregnated with a unique resin binder. The binder is a polyimide reaction product of substantially stoichiometric amounts of a bis(etheranhydride) with a diamine compound, said reaction product being cross-linked with a tri-functional isocyanate agent.

DESCRIPTION OF THE INVENTION

The present laminates are of general, conventional composition. They are composed of at least 1 ply of fabric material which has been impregnated with a unique resin binder. Commonly, sufficient resin is also employed to coat the material. Further, the laminate is preferably composed of 2 or more such plies of fabric material. With such multiple plies of material, the resin binder both impregnates the plies and adherently unites them into an integral composition.

To form the present laminates, a solution of uncured resin may simply be brushed or applied using wiper bars onto a ply of fabric material. By state of the art methods, the impregnated fabric is then hung vertically in an air circulating oven to remove the major portion of the solvent. The temperature is not to exceed the well-known unblocking temperature of the trifunctional isocyanate agent employed.

Compound laminates containing multiple plies, e.g., up to 6 or more, of fabric material may be made in analogous manner. Generally the plies are separately impregnated and then laid one upon the other. While the same curing conditions may be utilized, the composite is preferably further subjected to pressure during curing. A typical press cycle is as follows:

(a) load material in a room temperature press and apply 250–1000 psi pressure;
(b) raise temperature to 450° F. over a period of one hour and then hold at 450° F. for one hour;
(c) cool under 500 psi pressure for about 20 minutes; and
(d) post bake for four hours at 450° C.

Any conventional fabric material may be utilized in accordance with the present invention. Representative of such materials are glass cloth, metal screen and the like. Of these, flexible and/or porous materials are particularly preferred. Flexibility compliments the elastic properties of the resin and porosity insures good resin adhesion.

The resin employed in the present laminates is a polyimide which has been cross-linked with a tri-functional agent. It is this cross-linked polyimide which is responsible for the high temperature properties of these laminates.

This polyimide may be formed from any suitable bis(etheranhydride). A wide variety of such anhydrides are described in U.S. Pat. No. 3,847,867 of Darrell R. Heath, the complete disclosure of which is incorporated herein by reference.

Representation of these bis(etheranhydride) are ones having the formula:

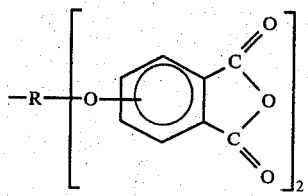

wherein R is a member selected from the class consisting of (a) the following divalent organic radicals:

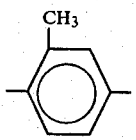

and

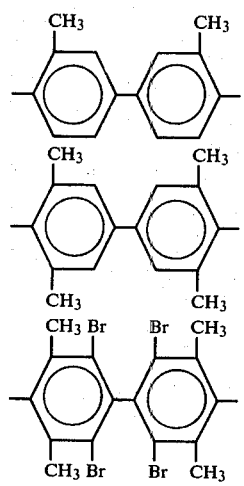

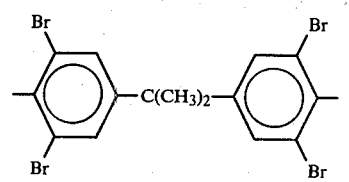

and (b) divalent organic radicals of the general formula:

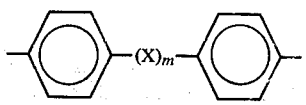

where X is a member selected from the class consisting of divalent radicals of the formulas:

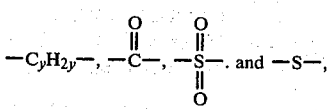

where m is 0 or 1, y is a whole number from 1 to 5, and the divalent bonds of the -O-R-O- radical are equally situated on the phthalic anhydride end groups, e.g., in the 3,3'-positions or the 4,4'-positions.

In a preferred embodiment, the polyimide may be formed through reaction between a diamine compound and bisphthalic anhydride having the formula:

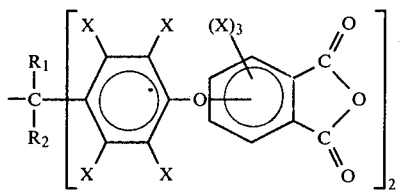

wherein: each of $R_1$ and $R_2$ is an alkyl group from 1 to 4 carbons; each X is selected from the group of a halide, an alkyl of 1 or 2 carbons and hydrogen.

Polymerization of the bis(etheranhydride) is achieved through reaction with a primary diamine compound. Suitable diamine compounds are readily available. Virtually any compound may be employed, although aromatic diamines are preferred.

These diamine compounds have the formula:

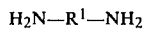

wherein $R^1$ may comprise essentially any divalent organic radical. Representative radicals include (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included by the formula:

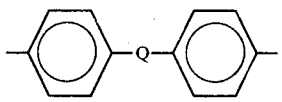

where Q is a member selected from the class consisting of

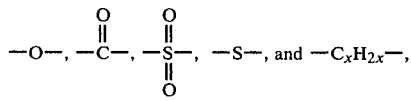

and x is a whole number from 1 to 5 inclusive.

Cross-linking of the polyimide is accomplished utilizing a tri-functional isocyanate agent. Again, there is no criticality as to the agent and one of the commerically available agents mentioned below is most conveniently employed.

To faciliate the cross-linking reaction, it is preferred to utilize blocked agent. Such blocked polyisocyanates are known in the polyester art. The term "blocked" means that the polyisocyanate has been reacted with a group that will split off at the temperature employed with the polymeric ether imide. As polyisocyanate components there may be mentioned the cyclic trimer of 2,4-tolylene diisocyanate; mixtures of the cyclic tri-isocyanate; 4,4'-diphenyl 2,4,6-triisocyanato toluene, and the like.

Typical compounds which can be used to block the isocyanate groupings, e.g., by forming phenol; meta-cresol; paracresol; ortho cresol and mixtures thereof; the xylenols, e.g., 2,6-dimethylphenol; 4-ethyl phenol, 4-t-butylphenol; 2-butylphenol; 4-n-octylphenol; 4-isooctylphenol, etc., monohydric alcohols, such as methyl alcohol; ethyl alcohol, n-propyl alcohol, and the like, acetoacetic ester, hydroxyalkylcarbamic acid aryl esters, e.g., hydroxyethylcarbamic acid phenylester, mercaptans, e.g., 2-mercaptobenzothiazole, methyl mercaptans, and the like.

Others include the cyclic trimer of 2,4-tolylene diisocyanate having the isocyanate groups blocked with tertiary butyl alcohol or tertiary amyl alcohol or dimethyl ethinyl carbinol or acetoacetic acid ester or phenol or cresylic acid or ε-caprolactam or 2-mercaptobenzothiazole, or succinimide or phthalimide or diphenyl amine or phenyl-β-naphthylamine, triphenyl methane tri-isocyanate having the isocyanate groups blocked with phenol or mixed cresols or tertiary butyl alcohol or phthalimide, 1,3,3-pentanetriisocyanate having the isocyanate groups blocked with m-cresol, etc.

As specific examples of such blocked isocyanates there may also be mentioned Mondur S, wherein the isocyanate groups of the reaction product of 3 moles of mixed 2,4- and 2,6-tolylene diisocyanate with trimethylol propane are blocked by esterification with phenol and Mondur SH, wherein the mixed cyclic trimers of 2,4- and 2,6-tolylene diisocyanates have the three free isocyanate groups blocked by esterification with phenol. At present Mondur SH is the preferred blocked polyisocyanate.

The amount of cross-linking agent employed may vary, dependent largely upon the proportion of free amic acid groups on the polyimide utilized. Normally, however, from 0.025 to 0.1 mole of isocyanate agent is utilized for each mole of bis(etheranhydride) in the polyimide.

Cross-linking will proceed in conventional manner at elevated temperatures. Thus, temperatures of at least about 50° C., more desirably from 50° to 250° C., for a period of 1 to 5 hours are preferred. Under these conditions, not only cross-linking, but also removal of the resin solvent, may be achieved.

As is evident from comparison of these cross-linking conditions with those preferred for final cure of the present resin binder, all or a part of these steps may occur at the same time. Consequently, the solution applied to a fabric material for lamination may consist essentially of the present polyimide and free isocyanate cross-linking agent. In this manner, the steps of the process may be condensed to occur simultaneously.

In either event, the solution applied to the fabric material normally contains between 10 and 30% resin solids. This ensures complete impregnation of the material. The solvent used should be readily vaporizable under the conditions of curing employed. Representative are cresylic acid and N-methylpyrrolidone (NMP). The dried and cured resin forms a tough and protective coating over and within the fabric materials(s) of the present laminates.

The present process is more fully described from the following example. This example is not limitative, but rather illustrative of this invention.

EXAMPLE 800 grams of the reaction product of equal molar amounts of 2,2 bis[4-(3,4-dicarboxyphenoxy)phenyl]-propane dianhydride with m-phenylene diamine were dissolved in a solvent solution of 960 grams of Solvesso 100 naptha and 2240 grams of cresylic acid. To 1000 g of the resultant resin solution was added 18 g of a 60% solution of trimerized toluenediisocyanate blocked with phenol (Mondur-SH) and 1.7 g of dibutyl tin dilaurate.

Sheets of No. 104 glass cloth were dipped into the resin solution and then partially dried by holding them at 100° C. for ½ hour. Sheets were then stacked in a four-ply laminate and placed in a press. After one hour at 200° C., the laminate was subjected to a pressure of 7 kg/cm for a further hour at 250° C.

The stacked sheets were then loaded into a press at room temperature and 250–1000 psi pressure is applied. The temperature is increased to 450° F. over a period of 1 hour and held for 1 hour at 450° F. The press is cooled under 500 psi for about 20 minutes. The laminate is post baked for 4 hours at 450° F.

The completely cured laminate was examined. It showed excellent integrity. These properties were attributed to the resin binding separate plies. The laminate also possessed good high temperature properties.

It is to be understood that changes may be made in the particular embodiment of the invention in light of the above teachings, but that these will be within the full scope of the invention as defined by the appended claims.

I claim:

1. In a laminate composition comprising a ply of fabric material impregnated with a solid resin binder, the improvement wherein said resin binder comprises polyetherimide reaction product of aromatic bis(etheranhydride) with organic diamine, said reaction product being cross-linked with tri-functional isocyanate agent.

2. The composition of claim 1, wherein the diamine is an aromatic diamine.

3. The composition of claim 1, wherein the aromatic bis(etheranhydride) is reacted with from 0.5 to 2 mole of diamine.

4. The composition of claim 1, wherein the aromatic bis(etheranhydride) is a bis-phthalic anhydride of the formula:

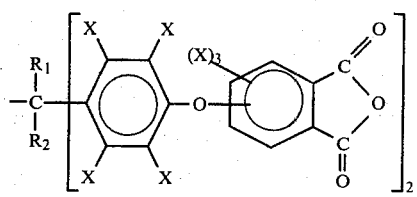

wherein each of $R_1$ and $R_2$ is an alkyl group of from 1 to 4 carbons; each X is selected from the group of a halide, an alkyl of 1 to 2 carbons and hydrogen.

5. The composition of claim 4, wherein the anhydride is 2,2 bis[4(3,4-dicarboxyphenoxy)phenyl]-propane dianhydride.

6. The composition of claim 4, wherein the diamine is m-phenylene diamine.

7. The composition of claim 4, wherein the agent is a blocked, tri-functional isocyanate.

8. The composition of claim 4, wherein the polyimide is cross-linked with from 0.025 to 0.1 mole of isocyanate agent for each mole of bis-phthalic anhydride in said polyimide.

9. The composition of claim 4, wherein the agent is blocked, toluenediisocyanate trimer.

10. The composition of claim 1, wherein the polyimide is cross-linked with from 0.025 to 0.1 mole of isocyanate agent for each mole of bis(etheranhydride) in said polyimide.

11. The composition of claim 1, wherein the fabric material is glass cloth.

12. The composition of claim 1, wherein there are from 2 to 6 plies of fabric material impregnated with, and adherently united by, the resin binder.

* * * * *